US012713189B2

(12) United States Patent
Elghannai et al.

(10) Patent No.: US 12,713,189 B2
(45) Date of Patent: Aug. 18, 2026

(54) HEARING AID ANTENNA FOR HIGH-FREQUENCY DATA COMMUNICATION

(71) Applicant: Starkey Laboratories, Inc., Eden Prairie, MN (US)

(72) Inventors: Ezdeen Elghannai, Eden Prairie, MN (US); Karl Joseph Hilde, Minneapolis, MN (US); Zhenchao Yang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 219 days.

(21) Appl. No.: 18/241,045

(22) Filed: Aug. 31, 2023

(65) Prior Publication Data

US 2023/0412992 A1 Dec. 21, 2023

Related U.S. Application Data

(63) Continuation of application No. 17/366,457, filed on Jul. 2, 2021, now Pat. No. 11,785,400, which is a (Continued)

(51) Int. Cl.

*H04R 25/00* (2006.01)
*H01Q 1/27* (2006.01)
*H04R 1/10* (2026.01)

(52) U.S. Cl.

CPC ........... *H04R 25/558* (2013.01); *H01Q 1/273* (2013.01); *H04R 1/10* (2013.01); *H04R 25/554* (2013.01);

(Continued)

(58) Field of Classification Search

CPC ...... H04R 25/558; H04R 1/10; H04R 25/554; H04R 25/602; H04R 25/658; H01Q 1/273

See application file for complete search history.

(56) References Cited

U.S. PATENT DOCUMENTS 5,721,783 A 2/1998 Anderson
7,256,747 B2 8/2007 Victorian et al.

(Continued)

FOREIGN PATENT DOCUMENTS

CN 106102831 B 8/2019
EP 2680366 B1 1/2014

(Continued)

OTHER PUBLICATIONS

Kammersgaard et al., "Body-Worn Spiral Monopole Antenna for Body-Centric Communications," Proceedings of the 2015 International Workshop on Antenna Technology, Mar. 4-6, 2015, 4 pp.

(Continued)

*Primary Examiner* — Carolyn R Edwards
*Assistant Examiner* — Dylan Maguire Neece
(74) *Attorney, Agent, or Firm* — Shumaker & Sieffert, P.A.

(57) ABSTRACT

Hearing aids having example antennas tuned to transmit and receive signals having a frequency greater than or equal to 2.4 GHz are described. The antenna includes a first segment and a second segment. The first segment is configured to fit inside a housing of the hearing aid and to be within the ear canal when the hearing aid is inserted into an ear of a wearer. The second segment is configured to be within the housing and disposed near a side of the housing facing toward an outside of the ear canal when the hearing aid is inserted into the ear of the wearer.

16 Claims, 8 Drawing Sheets

Related U.S. Application Data continuation of application No. 16/732,741, filed on Jan. 2, 2020, now Pat. No. 11,057,723, which is a continuation of application No. 16/144,738, filed on Sep. 27, 2018, now Pat. No. 10,547,957.

(52) U.S. Cl.
CPC ......... *H04R 25/602* (2013.01); *H04R 25/658* (2013.01); *H04R 2225/51* (2013.01)

(56) References Cited

U.S. PATENT DOCUMENTS

| | | | | |
|---|---|---|---|---|
| 7,446,720 | B2 | 11/2008 | Victorian et al. | |
| 7,593,538 | B2 | 9/2009 | Polinske | |
| 8,675,902 | B2 * | 3/2014 | Christensen | H01Q 9/27 381/322 |
| 9,167,360 | B2 | 10/2015 | Polinske et al. | |
| 9,525,930 | B2 | 12/2016 | Parkins | |
| 9,609,443 | B2 | 3/2017 | Ruaro et al. | |
| 9,968,781 | B2 | 5/2018 | Roehrlein et al. | |
| 9,972,895 | B2 | 5/2018 | Hirsch et al. | |
| 10,051,388 | B2 | 8/2018 | Polinske et al. | |
| 10,187,734 | B2 | 1/2019 | Kvist et al. | |
| 10,362,410 | B2 | 7/2019 | Ozden | |
| 10,406,372 | B2 | 9/2019 | Roehrlein et al. | |
| 10,547,957 | B1 | 1/2020 | Elghannai et al. | |
| 10,764,666 | B1 | 9/2020 | Napoles et al. | |
| 11,057,723 | B2 | 7/2021 | Elghannai et al. | |
| 11,323,833 | B2 | 5/2022 | Polinske et al. | |
| 11,785,400 | B2 | 10/2023 | Elghannai et al. | |
| 2005/0203584 | A1 | 9/2005 | Twetan et al. | |
| 2013/0343586 | A1 | 12/2013 | Kvist et al. | |
| 2014/0307904 | A1 | 10/2014 | Polinske et al. | |
| 2015/0289062 | A1 | 10/2015 | Ungstrup et al. | |
| 2016/0050502 | A1 * | 2/2016 | Kvist | H04R 25/554 381/315 |
| 2016/0330552 | A1 | 11/2016 | Flood | |
| 2017/0026762 | A1 * | 1/2017 | Ruaro | H01Q 1/521 |
| 2017/0062913 | A1 | 3/2017 | Hirsch et al. | |
| 2017/0150278 | A1 | 5/2017 | Ruaro | |
| 2018/0124528 | A1 | 5/2018 | Polinske et al. | |
| 2018/0138584 | A1 * | 5/2018 | Leung | H01Q 9/26 |
| 2018/0242074 | A1 | 8/2018 | Xu et al. | |
| 2018/0352345 | A1 | 12/2018 | Polinske et al. | |
| 2018/0359575 | A1 | 12/2018 | Thaysen | |
| 2019/0006757 | A1 | 1/2019 | Nikles et al. | |
| 2019/0069101 | A1 | 2/2019 | Kvist | |
| 2019/0165456 | A1 | 5/2019 | Elghannai | |
| 2019/0349694 | A1 | 11/2019 | Farmakidis et al. | |
| 2020/0335856 | A1 | 10/2020 | Kim et al. | |
| 2021/0067859 | A1 | 3/2021 | Sakane et al. | |
| 2021/0337323 | A1 | 10/2021 | Elghannai et al. | |
| 2022/0225011 | A1 | 7/2022 | Elghannai et al. | |

FOREIGN PATENT DOCUMENTS

| | | | |
|---|---|---|---|
| EP | 2897385 | A1 | 7/2015 |
| EP | 2983379 | A2 | 2/2016 |
| EP | 3174314 | A1 | 5/2017 |
| EP | 3531718 | A1 | 8/2019 |
| EP | 3554096 | A1 | 10/2019 |
| JP | 2002111352 | A | 4/2002 |
| JP | 2017147566 | A | 8/2017 |
| JP | 2018519739 | A | 7/2018 |
| WO | 2015147772 | A1 | 10/2015 |
| WO | 2018114063 | A1 | 6/2018 |
| WO | 2019035561 | A1 | 2/2019 |
| WO | 2019130843 | A1 | 7/2019 |

OTHER PUBLICATIONS

Prosecution History from U.S. Appl. No. 16/144,738, dated Feb. 25, 2019 through Oct. 1, 2019, 30 pp.

Prosecution History from U.S. Appl. No. 16/732,741, dated May 21, 2020, through Mar. 18, 2021, 53 pp.

Prosecution History from U.S. Appl. No. 17/366,457, now issued U.S. Pat. No. 11,785,400, dated Jul. 8, 2022 through Jun. 1, 2023, 68 pp.

Search Report from counterpart European Application No. 19200192.3, dated Nov. 16, 2021, 7 pp.

* cited by examiner

HEARING AID ANTENNA FOR HIGH-FREQUENCY DATA COMMUNICATION

This application is a continuation of U.S. patent application Ser. No. 17/366,457, filed Jul. 2, 2021, which is a continuation of U.S. patent application Ser. No. 16/732,741, filed Jan. 2, 2020 and issued as U.S. Pat. No. 11,057,723 on Jul. 6, 2021, which is a continuation of U.S. patent application Ser. No. 16/144,738, filed Sep. 27, 2018 and issued as U.S. Pat. No. 10,547,957 on Jan. 28, 2020, the entire content of each application is incorporated herein by reference.

TECHNICAL FIELD

This disclosure relates to hearing assistance devices.

BACKGROUND

A user may use one or more hearing assistance devices (commonly referred to as "hearing aids" and "hearing instruments") to enhance the user's ability to hear sound. Example types of hearing assistance devices include hearing aids, cochlear implants, and so on. A typical hearing assistance device includes one or more microphones. The hearing assistance device may generate a signal representing a mix of sounds received by the one or more microphones and output an amplified version of the received sound based on the signal.

Hearing assistance devices can have wired and wireless connectivity to external devices to transmit information for the functionality of the hearing aid. For example, the hearing aid uses a connection to an external device to transmit status information, such as battery life or current volume, to the user. Additionally, a separate device may send control signals over the communication channel to the hearing aid in order to configure the settings of the hearing aid.

SUMMARY

In general, this disclosure describes techniques for integrating high-frequency communication technology, such as 2.4 GHz Bluetooth Low Energy (BLE) technology, within hearing aid devices. To integrate BLE technology in a hearing aid, an antenna should be designed to receive and transmit in accordance with the high-frequency requirements of BLE. For example, the resonant frequency of the antenna should be approximately 2.4 GHz.

A dipole antenna designed for 2.4 GHz communication may have a size (e.g., length) of 6 centimeters (cm). However, hearing aid devices such as in-the-canal (ITC) and in-the-ear (ITE) devices are small in size, and may not be able to fit a 6 cm antenna. Accordingly, it may be difficult to design an antenna that delivers satisfactory performance for BLE technology frequencies while being contained by or within a small device.

The techniques of this disclosure describe examples of antennas that are configured to fit in small hearing aid devices such as ITC and ITE devices and to work with high frequency communication technologies such as BLE. For example, the techniques described in this disclosure may leverage differences in dielectric constants internal to the ear and external to the ear of a user (e.g., differences in dielectric constant inside the human head and the dielectric constant of air). A first portion of the antenna may be formed within a housing of the hearing aid that is configured to reside within the ear canal of the user. A second portion of the antenna may be configured to be within an internal perimeter of the housing and face toward an outside of the ear canal. In this manner, the antenna is properly sized to allow communication at high frequencies, e.g., for BLE communication, but is formed to fit within a housing of the hearing aid.

In one example, the disclosure describes a hearing aid comprising a housing configured to fit inside an ear canal, an antenna within the housing, and circuitry, within the housing, coupled to the antenna and configured to transmit the signals to the antenna and receive the signals from the antenna. The antenna comprises a first segment configured to fit inside the housing and to be within the ear canal when the hearing aid is inserted into an ear of a wearer, and a second segment configured to be within the housing and disposed near a side of the housing facing toward an outside of the ear canal when the hearing aid is inserted into the ear of the wearer. The first segment is shorter than the second segment, and the antenna is tuned to transmit and receive signals having a frequency equal to or greater than 2.4 GHz.

In one example, the disclosure describes a method of manufacturing a hearing aid, the method comprising forming a first segment of an antenna of the hearing aid to fit inside a housing of the hearing aid and to be within an ear canal when the hearing aid is inserted into an ear of a wearer, forming a second segment of the antenna of the hearing aid to be within the housing and disposed near a side of the housing facing toward an outside of the ear canal when the hearing aid is inserted into the ear of the wearer, and coupling the antenna to circuitry within the housing that is configured to transmit the signals to the antenna and receive the signals from the antenna. The first segment is shorter than the second segment, and the antenna is tuned to transmit and receive signals having a frequency equal to or greater than 2.4 GHz.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

The disclosure describes examples of antennas and a method of manufacturing antennas for hearing aids that allow the hearing aids to communicate at relatively high-frequencies, such as those in accordance with Bluetooth Low Energy (BLE) technology, while being sized and/or shaped to fit within form factors of smaller hearing assistance devices such as in-the-canal (ITC) and in-the-ear (ITE) hearing aids. BLE frequencies are approximately 2.4 GHz (e.g., 2.40 GHz to 2.48 GHz or 2.404 GHz to 2.478 GHz).

Integrating BLE technology within hearing aids is of interest because many devices with which hearing aids communicate data are already configured to communicate using BLE technology. As an example, a smart phone or other so-called smart devices may transmit data to the hearing aids, such as data that sets a gain of the hearing aid or other operational parameters of the hearing aids. Hearing aids may transmit data to smart devices such as data that indicates battery level of the hearing aids. Hearing aids and smart devices communicate for reasons in addition to those provided in the above examples.

To accommodate for BLE technology, a hearing aid should include a BLE radio system (e.g., an antenna configured to receive and transmit at BLE frequencies and circuitry configured to receive and transmit data modulated in accordance with BLE). For devices such as in-the-canal (ITC) or in-the-ear (ITE) hearing aids, the small size of the ITC/ITE hearing aids pose a problem in designing antennas that can perform well and not be uncomfortable to the patient. This disclosure describes examples of antennas and examples of manufacturing hearing aids having such antennas, e.g., for ITC/ITE hearing aids. The example antennas, as described in more detail, may be referred to as Vee-antennas. The example antennas may have high total radiated power (TRP) and yield better performance in terms of the antenna total efficiency when matched to the circuitry. In addition, the example antennas may be easy to integrate/fabricate mechanically within the housing of the ITC/ITE hearing aid.

Figure 1:
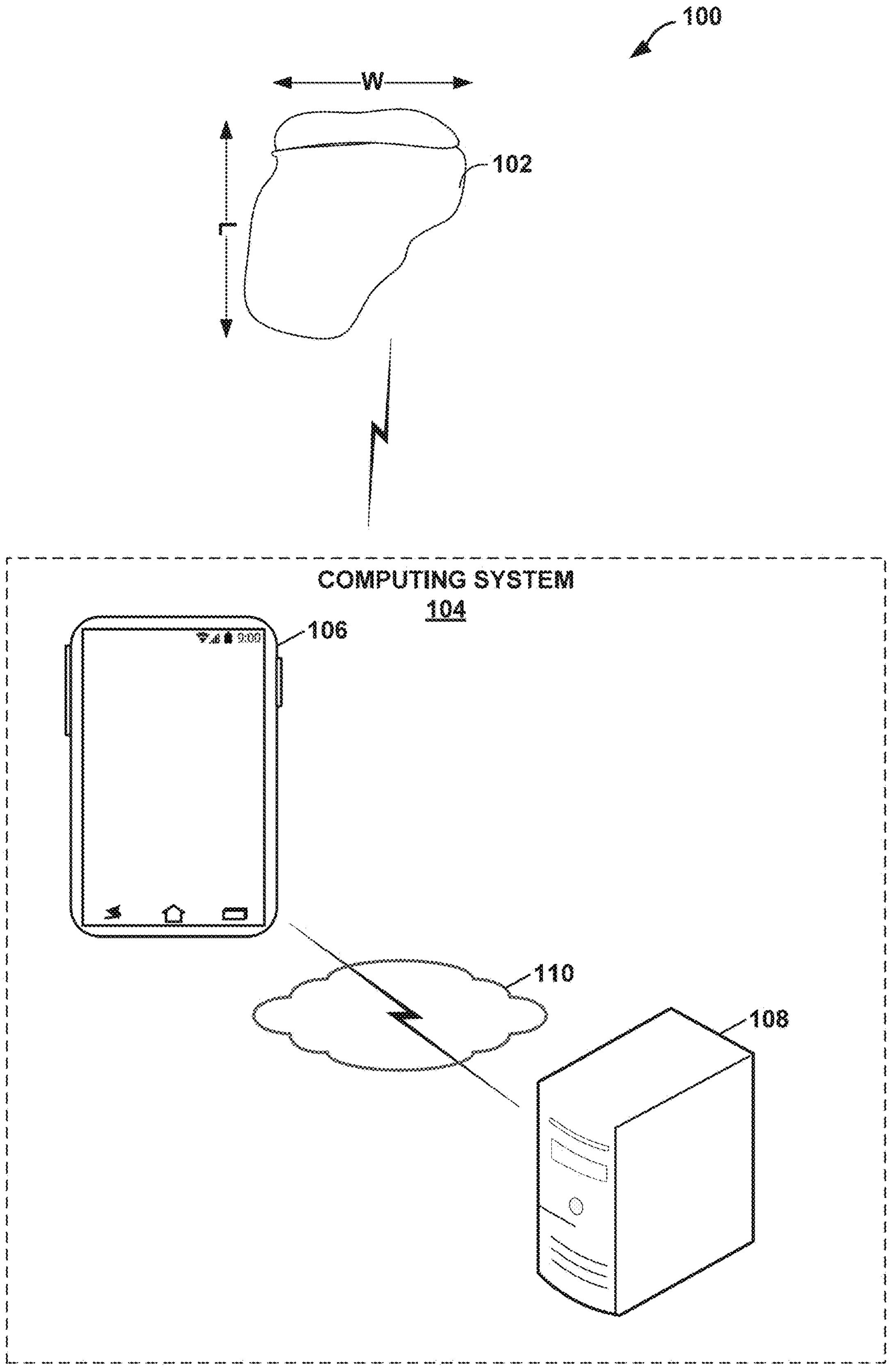
FIG. 1 illustrates an example system for use of a hearing aid having an antenna configured for high-frequency communication, in accordance with one or more aspects of this disclosure.

FIG. 1 illustrates an example system 100 for use of a hearing aid having an antenna configured for high-frequency communication, in accordance with one or more aspects of this disclosure. In the example of FIG. 1, system 100 comprises a hearing aid 102 and a computing system 104. Computing system 104 comprises one or more electronic devices. For instance, in the example of FIG. 1, computing system 104 comprises a mobile device 106, a server device 108, and a communication network 110.

Hearing aid 102 is configured to provide hearing assistance. In this example illustrated in FIG. 1, hearing aid 102 is an in-the-ear (ITE) or in-the-canal (ITC) hearing aid. For example, hearing aid 102 is configured to be sized so that hearing aid 102 fits within the ear canal or within the ear of the wearer, rather than being behind-the-ear (BTE) and/or receiver-in-canal (MC) hearing aids. For example, in ITC and ITE hearing aids, the housing of the hearing aid creates a cavity and all components of the hearing aid, such as processors, radios, antennas, and the like, generally fit within the cavity. The entire hearing aid then fits within the ear or ear canal. In BTE or RIC hearing aids, a portion of the hearing aid fits inside the ear or ear canal, and the other portion (e.g., the portion that includes the processing circuitry and other components) is in a separate housing external to the ear.

Although the example techniques are described with respect to hearing aid 102, the example techniques are not so limited. The techniques described in this disclosure are applicable generally to hearing-assistance devices, and hearing aid 102 is an example of a hearing assistance device. The example techniques are also applicable to BTE and MC hearing aids. Other examples of hearing-assistance devices include a Personal Sound Amplification Product (PSAP), a hearable with amplification features, or other types of devices that assist with hearing. The techniques of this disclosure are not limited to the form of hearing aid 102 shown in FIG. 1.

Hearing aid 102 is configured to communicate wirelessly with computing system 104. For example, hearing aid 102 and computing system 104 may communicate wirelessly using a BLUETOOTH™ technology, including Bluetooth Low Energy (BLE) technology, a WIFI™ technology, or another type of wireless communication technology. In the example of FIG. 1, hearing aid 102 may communicate wirelessly with mobile device 106. In some examples, hearing aid 102 may use a 2.4 GHz frequency band, such as those of the BLE technology, for wireless communication with mobile device 106 or other computing devices. BLE frequencies are approximately 2.4 GHz (e.g., 2.40 GHz to 2.48 GHz or 2.404 GHz to 2.478 GHz).

Mobile device 106 may communicate with server device 108 via communication network 110. Communication network 110 may comprise various types of communication networks, such as cellular data networks, WIFI™ networks, the Internet, and so on. Mobile device 106 may communicate with server device 108 to store data to and retrieve data from server device 108. Thus, from the perspective of mobile device 106 and hearing aid 102, server device 108 may be considered to be in the "cloud."

Hearing aid 102 may implement a variety of features that help a wearer of hearing aid 102 hear better. For example, hearing aid 102 may amplify the intensity of incoming sound, amplify the intensity of certain frequencies of the incoming sound, or translate or compress frequencies of the incoming sound. In another example, hearing aid 102 may implement a directional processing mode in which hearing aid 102 selectively amplifies sound originating from a particular direction (e.g., to the front of the wearer) while potentially fully or partially canceling sound originating from other directions. In other words, a directional processing mode may selectively attenuate off-axis unwanted sounds. The directional processing mode may help wearers understand conversations occurring in crowds or other noisy environments. In some examples, hearing aid 102 may reduce noise by canceling out certain frequencies. Furthermore, in some examples, hearing aid 102 may help a wearer enjoy audio media, such as music or sound components of visual media, by outputting sound based on audio data wirelessly transmitted to hearing aid 102 by mobile device 106.

Hearing aid 102 and mobile device 106 communicate data in a relatively high-frequency band (e.g., greater than or equal to 2.4 GHz). In some examples, hearing aid 102 may communicate directly with another hearing aid (e.g., hearing aid in other ear) in the relatively high-frequency band. As one example, as described above, hearing aid 102 and mobile device 106 communicate data in accordance with BLE technology. In BLE technology, hearing aid 102 should be configured to receive and transmit data within a frequency band of approximately 2.4 to 2.483 GHz. Use of BLE technology is desirable because of the low power usage, which is ideal for hearing aid 102 and mobile device 106, and because many types of mobile devices are already equipped with BLE technology. BLE technology and standard Bluetooth operate over the same 2.4 to 2.483 GHz frequency band. However, BLE technology uses a different frequency-hopping spread-spectrin (FHSS) scheme. Standard Bluetooth hops at a rate of 1600 hops per second over 79 (1-MHz-wide) channels. BLE FESS employs 40 (2-MHz-wide) channels to ensure greater reliability over longer distances Standard Bluetooth offers gross data rates of 1, 2, or 3 Mbits/s, while BLE's maximum rate is 1 Mbit/s with a net throughput of 260 kbits/s. BLE also uses Gaussian frequency shift keying (GFSK) modulation.

To effectuate the high-frequency communication, hearing aid 102 includes an antenna within its housing. The electrical components of hearing aid 102, including the antenna for high-frequency communication, are within a cavity formed by the housing. The length of a dipole antenna specifically designed for a particular frequency is approximately lambda/2, where lambda equals the wavelength of the electromagnetic signal the antenna receives or the wavelength at which the antenna is to transmit an electromagnetic signal.

A dipole antenna includes two segments, and electrical circuitry is coupled between each end of the two segments. The other ends of the two segments of the dipole antenna are open. An electromagnetic signal is received across the two segments and converted into an alternating current. The alternating current is fed into electrical circuitry. For transmission, the electrical circuitry outputs an alternating current that the two segments of the dipole antenna radiate outwards as an electromagnetic signal.

For example, for a 2.45 GHz electromagnetic signal, the wavelength is approximately 12.2 cm (i.e., speed of light divided by 2.45 Ghz is approximately 12.2 cm). Therefore, for a dipole antenna in free space where the dielectric constant is 1, the entire length of the dipole antenna would be 6.1 cm (e.g., lambda/2 equals 6.1 cm). Therefore, a first segment of the dipole antenna would have a size of approximately 3 cm, and a second segment of the dipole antenna would have a size of approximately 3 cm.

However, the width and length of hearing aid 102 is approximately 2.5 cm for the width and 1.7 cm for the length. However, the width and length may be different, as hearing aid is sized for the ear of the wearer. Hence, there may be a 20% increase or decrease in length and width (but other ranges are possible) based on size of the ear of the wearer. In general, a dipole antenna having length of 6.1 cm cannot fit within hearing aid 102 when the dipole antenna is structured as a straight antenna.

One way in which to reduce the size of the antenna is to leverage the change in dielectric constant within the human head. For example, each segment of the dipole antenna is equal to approximately 3 cm when the dielectric constant is 1, which is the case in free space. However, inside the human head, the dielectric constant is substantially greater than 1 (e.g., more than 30 times greater). As one example, in accordance with the human head model, the dielectric constant inside a human head (e.g., in the ear canal) is approximately 35.4.

In one or more examples, a first segment of the antenna may be oriented approximately 90 degrees relative to a second segment of the antenna. For example, the antenna may be bent by approximately 90 degrees so that the first segment and the second segment form an L-shape (or inverted L-shape). Approximately 90 degrees may be within +20% of 90 degrees (e.g., 72 degrees to 108 degrees). By orienting the first segment approximately 90° relative to the second segment of the antenna, it may be possible to fit the first segment within the housing of hearing aid 102. For example, when the dielectric constant is 35.4, and the first segment is to be fit within the housing, the size of the first segment can be reduced from 3 cm to approximately 0.5 cm, and still be tuned to receive and transmit data at relatively high-frequencies such as 2.45 GHz. As noted above, in free space (e.g., dielectric constant of 1), the length of each segment is 3 cm, but when segment is in an environment where the dielectric constant is substantially greater than 1 (e.g., 35.4x inside the head), the size of a segment can be reduced from 3 cm to 0.5 cm. Moreover, when the length of first segment is 0.5 cm, the length of the first segment is small enough to fit inside the housing of hearing aid 102. Accordingly, by orienting the first segment such that the first segment is to fit within the ear canal of the wearer, it is possible to reduce the size of the first segment such that the first segment fits within the housing of hearing aid 102 due to the substantial increase in the dielectric constant within the head of the patient.

By orienting the first segment approximately 90 degrees relative to the second segment, the dipole antenna transforms to a so-called vee antenna due to orthogonal orientation of the segments (e.g., if the corner at which the first segment and second segment meet where place at the bottom, the antenna would look like a V). For instance, if the L-shape of the antenna were rotated such that corner of the two segments of the L-shape was at the bottom, the result would look like a V-shape (or vee-shape). Although the first segment and the second segment are described as being approximately 90 degrees, where the segments meet end-to-end, the example techniques are not so limited. The first segment may be oriented in a variety of ways so long as the second segment fits within the housing so that the environment surrounding the second segment has a substantially higher dielectric constant than 1.

While the size of the first segment can be reduced because the first segment is fitted where there is increased dielectric constant, the second segment may be in the free space, with a reduced dielectric constant. For example, the second segment should be fitted into the housing of hearing aid 102, but is not located within the ear canal when a wearer inserts hearing aid 102 into the ear canal. Rather, the second segment will be in an environment outside the ear canal where the dielectric constant is approximately 1. Therefore, the length of second segment of the antenna may remain approximately 3 cm for 2.45 GHz communication frequencies.

In one or more examples, the second segment of the antenna may be configured within the perimeter of the housing of hearing aid 102 in various ways. As one example, the second segment may be formed as a loop, rather than a straight line. For instance, the second segment is bent to loop around to fit within a faceplate of hearing aid 102. Other shapes of the second segment are possible such as zig-zag (e.g., serpentine) or multiple concentric loops (e.g., spiral).

Accordingly, hearing aid 102 is an example hearing aid that includes a housing configured to fit inside an ear canal. Hearing aid 102 includes an antenna within the housing. The antenna includes a first segment configured to fit inside the housing and to be within the ear canal when the hearing aid is inserted into an ear of a wearer. The antenna also includes a second segment configured to be within an internal perimeter of the housing (e.g., inside the cavity formed by the housing) and disposed near a side of the housing and facing toward an outside of the ear canal (e.g., within a faceplate of hearing aid 102). For instance, the second segment is positioned in an environment having dielectric constant substantially equal to 1, and the first segment is positioned in an environment having a dielectric constant substantially greater than 1 when inserted into the ear of the wearer.

In such examples, the first segment is shorter than the second segment. For example, the first segment is approximately 0.5 cm (e.g., within a range of 0.4 cm and 0.6 cm) and the second segment is approximately 3 cm (e.g., within a range of 2 cm and 4 cm). The second segment may be looped back upon itself, or may be generally curved around the internal perimeter of the housing. For example, the second segment includes two ends, a first end that is open and not connected to the first segment, and a second end that is proximate to the first segment. The second segment looping back upon itself means that the first end is bent in a circular fashion to be proximate to the second end of the segment. As some additional examples, the second segment may be configured in a shape such as a circular shape, a spiral shape, or a serpentine shape. In this manner, the antenna may be configured to fit within the housing of the hearing aid and still be configured to transmit and receive signals having a frequency greater than or equal to 2.4 GHz (e.g., 2.4 GHz to 2.483 GHz).

Hearing aid 102 also includes circuitry that is coupled to the antenna and configured to transmit signals to the antenna and receive signals from the antenna. For example, the circuitry may be configured to modulate data that is to be transmitted using GFSK modulation and demodulate received data that was modulated using GFSK modulation. The circuitry may be considered as radio circuitry that modulates and transmits relatively high-frequency data and receives and demodulates relatively high-frequency data (e.g., in accordance with a BLE frequency band).

The circuitry may be configured to transmit and receive signals along a transmission line to or from the antenna. The impedance of the transmission line may be designed for a particular amount of impedance (e.g., 50 ohms). The transmission line may be configured such that there is little to no reactance. Therefore, the impedance of the transmission line may be equal to the resistance of the transmission line, which is some examples is 50 ohms. In one or more examples, the circuitry (e.g., radio circuitry of hearing aid 102) may be configured to have an input or output impedance that is approximately equal to impedance of the transmission line to avoid impedance mismatch.

However, the impedance of the antenna may not match that of the transmission line or that of the circuitry. In some examples, the antenna is shaped to further promote impedance matching. As one example, the antenna may be a capacitive. To counteract and tune the capacitance of the antenna, the first segment may be formed as a helix (e.g., by meandering the segment) to introduce inductance. In this way, the first segment is configured in a helix shape such that an impedance of the antenna is closer to an impedance of the circuitry coupled to the antenna as compared to the first segment having a linear shape.

There may be other potential benefits achieved with one or more example arrangements of the antenna. As one example, the shape of the antenna and a position of a battery of the hearing aid may be such that any electromagnetic signal that radiates inwards is reflected by the battery. Such reflection of electromagnetic signals may not be present in standard dipole arrangements. In such examples, the hearing aid includes a battery positioned inside the housing in a manner to reflect signals transmitted from the antenna.

Figure 2A:
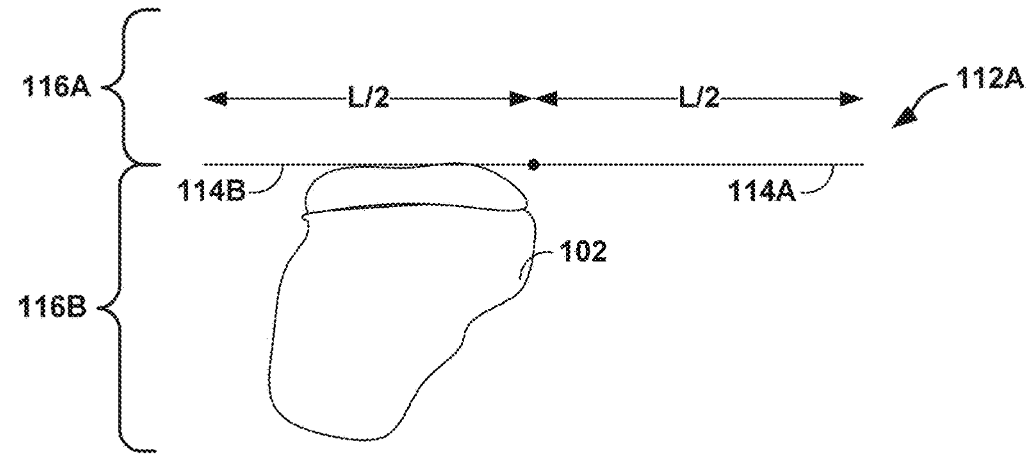
FIGS. 2A-2C are conceptual diagrams illustrating examples of antenna configurations, in accordance with one or more aspects of this disclosure.
Figure 2B:
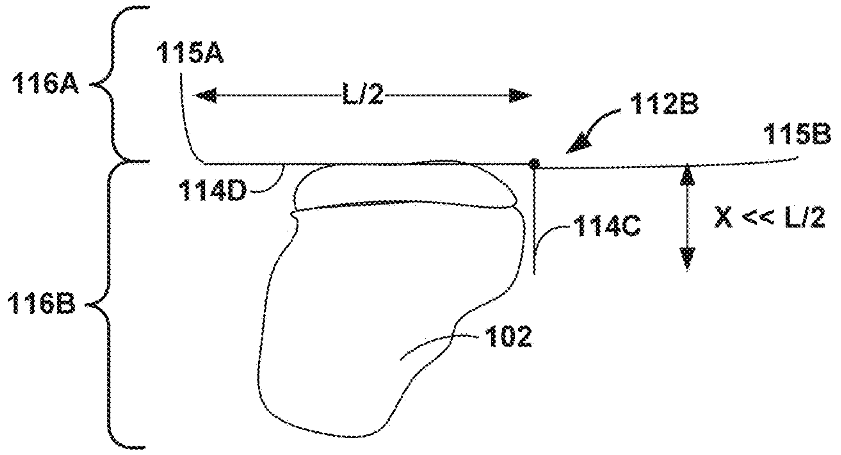
Figure 2C:
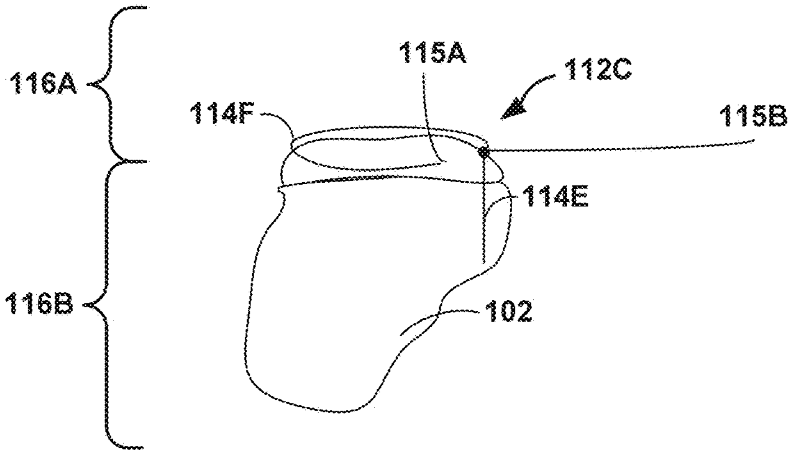

FIGS. 2A-2C are conceptual diagrams illustrating examples of antenna configurations. FIG. 2A illustrates antenna 112A, which is a dipole antenna. For perspective, antenna 112A is shown relative to hearing aid 102 of FIG. 1. Antenna 112A includes first segment 114A and second segment 114B. In the illustrated example of FIG. 2A, the total length of antenna 112A is L, and the length of first segment 114A is L/2, and the length of second segment 114B is L/2. As one example, as described above, the length L of antenna 112A is approximately equal to lambda/2, where lambda is equal to the wavelength of the electromagnetic signal. For instance, for 2.45 GHz, lambda/2 is equal to approximately 6 cm. Because each of first segment 114A and 114B is half the length of antenna 112A, the length of first segment 114A is lambda/4, or approximately 3 cm for 2.45 GHz electromagnetic signals, and the length of second segment 114B is lambda/4, or approximately 3 cm for 2.45 GHz electromagnetic signals. The thickness of first segment 114A and second segment 114B may be approximately 0.3 mm (e.g., 0.2 mm to 0.4 mm).

First segment 114A and second segment 114B are not directly connected to one another. Rather, respective ends of first segment 114A and second segment 114B are coupled to transmission lines that couple to circuitry within the housing of hearing aid 102. For example, the respective ends of first segment 114A and second segment 114B form as inputs to the electrical circuitry when receiving an electromagnetic signal, and form as outputs to the electrical circuitry when radiating (e.g., outputting) an electromagnetic signal. The coupling of respective other ends of first segment 114A and second segment 114B to transmission lines is shown with the dot in the center of antenna 112A. The dot in the center of antenna 112A represents two transmission lines, one for each one of first segment 114A and second segment 114B. The respective other ends of first segment 114A and second segment 114B are open ended (e.g., free floating with no or high impedance electrical connections), as shown.

As shown in FIG. 2A, in the dipole antenna arrangement of antenna 112A, antenna 112A cannot fit into the housing of hearing aid 102. As described in more detail, the example techniques provide ways to form an antenna so as to fit within the housing of hearing aid 102.

FIG. 2A also illustrates environment 116A and environment 116B. Environment 116A is the free space region (e.g., external to the ear canal), and the dielectric constant in environment 116A is approximately 1. Environment 116B is the region within the head of the wearer, and more specifically, the ear canal of the wearer. Therefore, hearing aid 102 is shown to be within environment 116B. However, the top surface of hearing aid 102 (e.g., the portion that is facing outwards from the ear canal), also called the faceplate, is within environment 116A. The portion facing outwards from the ear canal refers to the portion exposed out of the ear canal. One example property of environment 116B is that the dielectric constant within environment 116B is substantially greater than the dielectric constant within environment 116A. As one example, the dielectric constant within environment 116B is approximately 35.4. In general, the dielectric constant within environment 116B is more than 30 times the dielectric constant within environment 116A, and could be more than 20 times, 30 times, or 40 times the dielectric constant within environment 116A.

FIG. 2B illustrates an example where the dielectric constant of environment 116B is leveraged to reduce the size of the antenna. For instance, FIG. 2B illustrates antenna 112B, which is formed in a vee antenna shape, and includes first segment 114C and second segment 114D. First segment

114C and second segment 114D may be coupled to electrical circuitry within hearing aid 102 similarly to the description above with respect to FIG. 2A.

As shown first segment 114C is approximately 90 degrees (e.g., within 72 degrees and 108 degrees) relative to second segment 114D, but other angular bends are possible based on the tensile strength of the material used to form antenna 112B. For ease, first segment 114C is described as being 90 degrees relative to second segment 114D, but other bends, so long as first segment 114C is within environment 116B, are possible.

When first segment 114C is within the environment 116B, the increased dielectric constant of environment 116B allows the length of first segment 114C to be substantially less than the length of first segment 114A. For instance, as illustrated in FIG. 2B, the length of first segment 114C is X (e.g., approximately 0.5 cm in some examples), which is substantially less than L/2 or substantially less than lambda/4. In some examples, the length of first segment 114C may be less than 50%, 70%, or 80% the length of first segment 114A (e.g., (1-0.5 cm/3 cm) is 83%). As one example, for 2.45 GHz electromagnetic signals, the length of first segment 114C is approximately 0.5 cm which is approximately less than 20% the length of first segment 114C, which was 3 cm. The range of first segment 114C may be approximately 0.4 cm to 0.6 cm.

Furthermore, as shown in FIG. 2B, the length of first segment 114C may be small enough that first segment 114C can completely fit inside the housing of hearing aid 102. Therefore, with the vee antenna shape, it may be possible to form an antenna that is tuned to receive and transmit electromagnetic signals are approximately 2.45 GHz, where at least one segment of the antenna can fit within the housing of hearing aid 102. However, as shown in FIG. 2B, the length of second segment 114D may still be too long to allow second segment 114D to fit inside the housing of hearing aid 102. The thickness of first segment 114C and second segment 114D may be approximately 0.3 mm (e.g., 0.2 mm to 0.4 mm).

FIG. 2B also illustrates second segment 114D have a first end 115A and a second end 115B. First end 115A is illustrated as being open ended, and second end 115B is coupled to the transmission line that connects to the radio circuitry of hearing aid 102.

FIG. 2C illustrates antenna 112C, which is similar to antenna 112B. However, antenna 112C includes a segment that is bent to fit within the housing of hearing aid 102. For example, as illustrated, antenna 112C includes first segment 114E, which may be substantially similar, or identical, to first segment 114C. Antenna 112C includes second segment 114F, which as a length of L/2 or lambda/4, which is approximately 3 cm (example range include 2.5 cm to 3.5 cm) for 2.45 GHz electromagnetic signals.

In the illustrated example, second segment 114F is configured to curve around an internal perimeter of the housing of hearing aid 102. For example, the housing of hearing aid 102 forms a cavity. Second segment 114F may be curved to fit along the internal perimeter of the cavity. For example, second segment 114F may abut the internal perimeter of the cavity, or may be within a few millimeters (e.g., 5 to 10 mm) of the internal perimeter of the cavity.

FIG. 2C illustrates one example way in which second segment 114F may be shaped. For instance, FIG. 2C illustrates second segment 114F having a circular shape that loop backs towards itself. Other shapes are possible including shapes that are not along the internal perimeter of the housing are possible. For instance, second segment 114F may have a spiral shape or a serpentine (e.g., zig-zag) shape. The thickness of first segment 114E and second segment 114F may be approximately 0.3 mm (e.g., 0.2 mm to 0.4 mm).

As illustrated in FIG. 2C, second segment 114F includes a first end 115A and a second end 115B. As described above, first end 115A is open ended and not connected to any other component, and second end 115B is connected to the transmission line that connects to the radio circuitry of hearing aid 102. In the example illustrated in FIG. 2C, first end 115A is bent so that first end 115A is wrapped in a circular fashion to be proximate to second end 115B. In some examples, after wrapping around, the distance between first end 115A and second end 115B may be approximately 3.5 mm (e.g., range between 1 mm and 5 mm).

In general, first end 115A may be bent in such a way that second segment 114F lies along the perimeter of the housing of hearing aid 102 (e.g., along the internal perimeter of the faceplate within which second segment 114F is located). Although a circular bend is illustrated, other types of bends such as second segment 114F having a square, rectangle, octagonal, etc. bends are possible where second segment 114F is bend such that first end 115A is proximate to second end 115B.

Moreover, after the bend, first end 115A need not necessarily be proximate to second end 115B. For example, if the perimeter of the faceplate of hearing aid 102 is larger than 3 cm, then it is possible that first end 115A will not be proximate to second end 115B because the size of segment 114F is approximately 3 cm, which is less than the perimeter of the faceplate. As another example, if may be possible for there to be multiple loops of second segment 114F. For example, if the perimeter of the faceplate of hearing aid 102 is less than 3 cm, then it is possible that first end 115A will wrap around and extend beyond second end 115B because the size of segment 114F is approximately 3 cm, which is greater than the perimeter of the faceplate.

In the example illustrated in FIG. 2C, second segment 114F is within environment 116A, and therefore, the size of second segment 114F may need to be the same as the size of second segment 114D of FIG. 2B because both second segment 114F and second segment 114D are in the same environment 116A. By bending second segment 114F (e.g., as illustrated in FIG. 2C with curving first end 115A around the faceplate, or other ways), second segment 114F may be formed to fit within the housing of hearing aid 102. In this way, first segment 114E is configured to fit inside the housing and to be within the ear canal when the hearing aid is inserted into an ear of a wearer. Second segment 114F is configured to be within the housing and disposed near a side of the housing facing toward an outside of the ear canal (e.g., the disposed in the faceplate) when the hearing aid is inserted into the ear of the wearer.

The electrical circuitry, that receives data from or transmits data to, antenna 112C may be coupled to the transmission lines extending from the dot shown in antenna 112C. As described in more detail, rather than keeping first segment 114E as a linear shape, by forming first segment 114E as a helix, it may be possible to counteract the capacitance of antenna 112C to provide better impedance matching with the transmission line and the electrical circuitry.

Accordingly, FIG. 2C illustrates an example of hearing aid 102 having a housing that fits inside an ear canal. Hearing aid 102 includes antenna 112C having a first segment 114E configured to fit inside the housing and to be within the ear canal when hearing aid 102 is inserted into an ear of a wearer. Antenna 112C also includes a second segment 114F configured to be within an internal perimeter of the housing and disposed near a side of the housing and facing toward an outside of the ear canal (e.g., second segment 114F is in the environment 116A and first segment 114E is in the environment 116B). For example, second segment 114F is located within the faceplate of the housing of hearing aid 102, where the faceplate is in environment 116A, while the rest of the housing of hearing aid 102 is within the ear canal. First segment 114E may be shorter than second segment 114F. In some examples, first segment 114E may be substantially orthogonal (e.g., 90 degree) to second segment 114F. Antenna 112C may be tuned to transmit and receive signals having a frequency equal to or greater than 2.4 GHz (e.g., 2.4 GHz to 2.483 GHz for BLE technology).

The example of FIG. 2C may have some additional advantages. As one example, due to the structure of second segment 114F and a location of the battery within the housing of hearing aid 102, the battery acts like a reflector in both sides (e.g., out of the ear canal and downwards). The reflective characteristic of the battery, such as when second segment 114F is shaped as being curved, may increase directivity by at least 3 dB compared to normal dipole antenna such antenna 112A.

Figure 3:
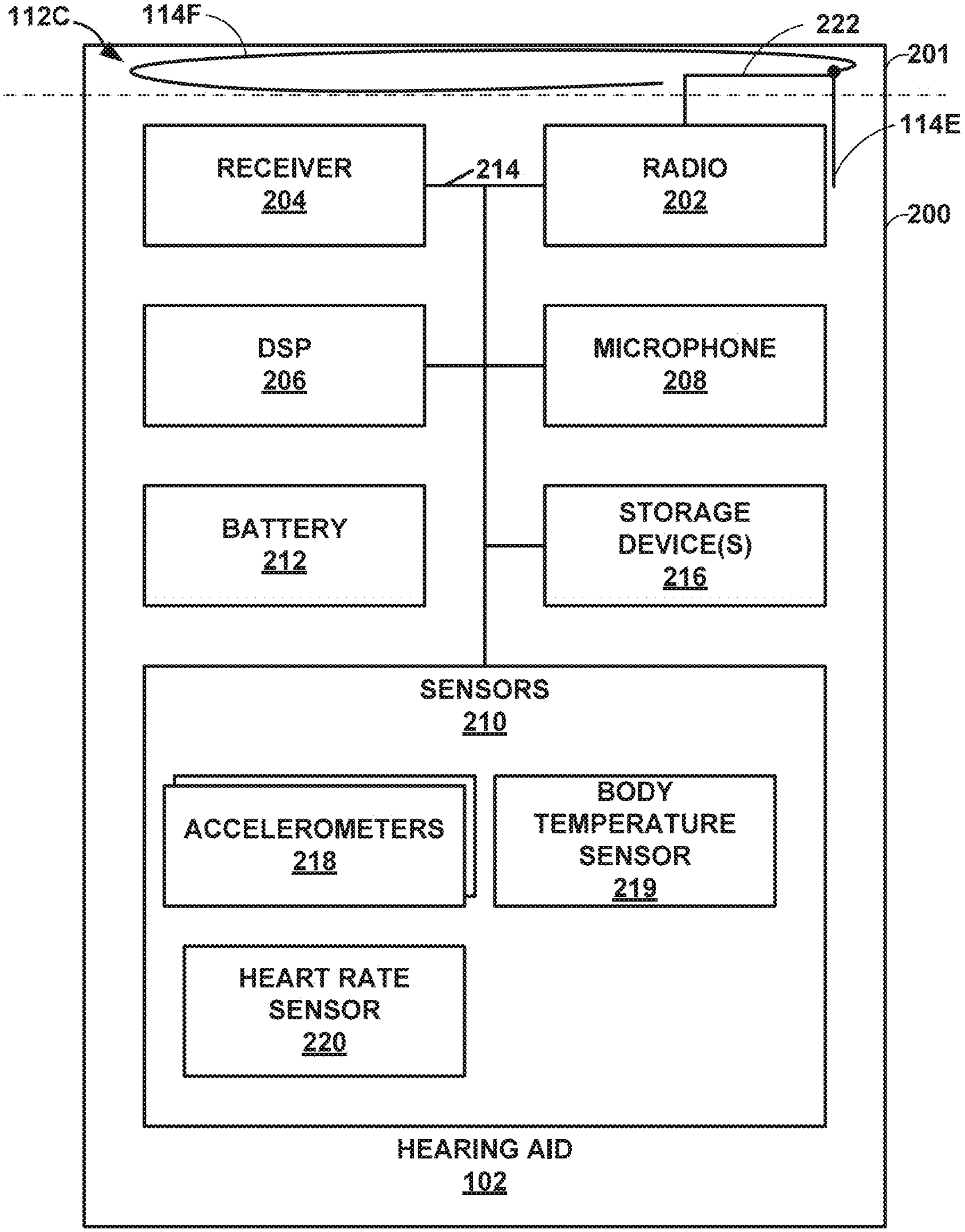
FIG. 3 is a block diagram illustrating example components of a hearing aid, in accordance with one or more aspects of this disclosure.

FIG. 3 is a block diagram illustrating example components of hearing aid 102, in accordance with one or more aspects of this disclosure. As illustrated, hearing aid 102 includes housing 200, which forms a cavity within which the components of hearing aid 102 reside. Also, part of housing 200 is faceplate 201. In the example illustrated in FIG. 3, faceplate 201 includes second segment 114F of antenna 112C of FIG. 2C, and the portion of housing 200 that fits within the ear canal includes first segment 114E of antenna 112C of FIG. 2C. For instance, the dashed line in FIG. 3 is meant to illustrate that faceplate 201 of housing 200 is within environment 116A, and the remainder of housing 200 is within environment 116B.

In the example of FIG. 3, hearing aid 102 includes a radio 202, a receiver 204, a digital signal processor (DSP) 206, a microphone 208, a set of sensors 210, a battery 212, one or more communication channels 214, and one or more storage devices 216. Communication channels 212 provide communication between storage device(s) 216, radio 202, receiver 204, DSP 206, a microphone 208, sensors 210. Components 202, 204, 206, 208, 210, 214, and 216 draw electrical power from battery 212. In some examples, battery 212 is rechargeable. Moreover, battery 212 may be positioned such that any communication transmitted by antenna 112C reflects off of battery 212 to increase directivity of the electromagnetic signal.

In the example of FIG. 2, sensors 210 include one or more accelerometers 218. Additionally, in the example of FIG. 2, sensors 210 also include a body temperature sensor 219 and a heart rate sensor 220. Sensors 210 are shown as examples only and may not be present in all examples of hearing aid 102. In other examples, hearing aid 102 may include more, fewer, or different components.

Radio 202 may enable hearing aid 102 to send data to and receive data from one or more other computing devices. For example, radio 202 may enable hearing aid 102 to send data to and receive data from mobile device 106 (FIG. 1). Radio 202 may use various types of wireless technology to communicate. For instance, radio 202 may use Bluetooth, Bluetooth Low Energy (BLE), 3G, 4G, 4G LTE, ZigBee, WiFi, or another communication technology.

Radio 202 is an example of electronic circuitry that is coupled to a transmission line 222 that connects antenna 112C to radio 202. Radio 202 may be configured to modulate and demodulate in accordance with GFSK for the BLE technologies, as one example, and transmit and receive data at relatively high-frequencies (e.g., 2.4 GHz and greater). In some examples, for better impedance matching with transmission line 222 and/or radio 202, first segment 114E may be formed having a helix shape. Although not shown, in some examples, an impedance matching circuit may be present between transmission line 222 and/or radio 202 and antenna 112C. The impedance matching circuit may have an impedance on a first side that matches the impedance of antenna 112C, and have an impedance on a second side that matches the impedance of transmission line 222 and/or radio 202. The impedance matching circuit may reduce reflections due to impedance mismatches, but may be lossy (e.g., reduce signal amplitude).

Receiver 204 includes one or more speakers for generating audible sound. Microphone 208 detects incoming sound and generates an electrical signal (e.g., an analog or digital electrical signal) representing the incoming sound. DSP 206 may process the signal generated by microphone 208 to enhance, amplify, or cancel-out particular channels within the incoming sound. DSP 206 may then cause receiver 204 to generate sound based on the processed signal.

Sensors 210 may generate various types of signals. DSP 206 may use the signals generated by sensors 210 to generate sensor data. For example, DSP 206 may use signals generated by body temperature sensor 219 and heart rate sensor 220 to generate biometric data (e.g., data indicating a body temperature and heart rate of a wearer of ear-wearable device 102). In another example, DSP 206 may use signals from accelerometers 218 to generate movement data indicative of movements of hearing aid 102. In some examples, storage device(s) 216 may store sensor data generated by DSP 206.

DSP 206 may cause radio 202 to transmit various types of data. For example, DSP 206 may cause radio 202 to transmit movement data, sensor data, or other types of data to computing system 104. As other examples, DSP 206 may cause radio 202 to transmit information indicating battery life of battery 212. In some examples, DSP 206 may cause radio 202 to transmit audio data representing sound detected by microphone 208 to computing system 104 (FIG. 1). Furthermore, radio 202 may receive audio data from computing system 104 and DSP 206 may cause receiver 204 to output sound based on the audio data.

Figure 4:
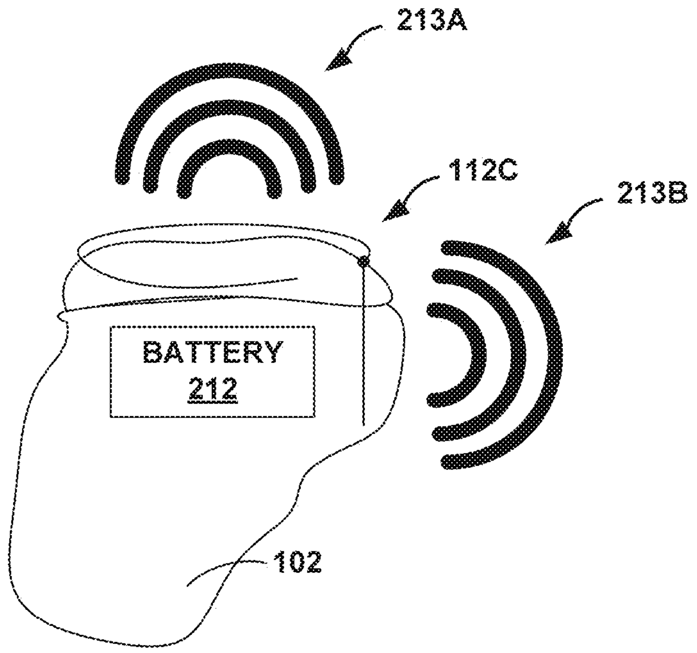
FIG. 4 is a block diagram illustrating an example of using a battery for directivity of communication signal for high-frequency communication.

FIG. 4 is a block diagram illustrating an example of using a battery for directivity of communication signal for high-frequency communication. As illustrated, hearing aid 102 includes battery 212, which provides power to components of hearing aid 102 as described above with respect to FIG. 3. In the example of FIG. 4, antenna 112C transmits a communication signal for high-frequency communication. For example, radio 202 (FIG. 3) may output an electrical signal that antenna 112C radiates as a communication signal. The communication signal radiating outwards is illustrated as communication signal 213A and 213B.

In some examples, part of the communication signal (e.g., electromagnetic signal) may radiate inwards into hearing aid 102, instead of radiating outwards. In one or more examples, the position of battery 212 may be such that communication signals that radiate inwards are reflected off of battery 212 and contribute to communication signal 213A and 213B. For instance, the total power of the communication signal that is radiated outward via communication signal 213A and 213B may be greater due to the reflection off of battery 212. Such reflections may not be present in standard dipole arrangements. In some examples, battery 212 may abut the side of second segment 114F from inside housing 200. Battery 212 may be proximate to the second segment 114F (e.g., less than 10 mm) from inside housing 200.

For example, due to the structure of second segment 114F and a location of battery 212 within the housing of hearing aid 102, battery 212 acts like a reflector in both sides (e.g., out of the ear canal and downwards), shown with communication signals 213A and 213B. The reflective characteristic of battery 212, such as when second segment 114F is shaped as being curved, may increase directivity by at least 3 dB compared to normal dipole antenna such antenna 112A of FIG. 2A.

Figure 5:
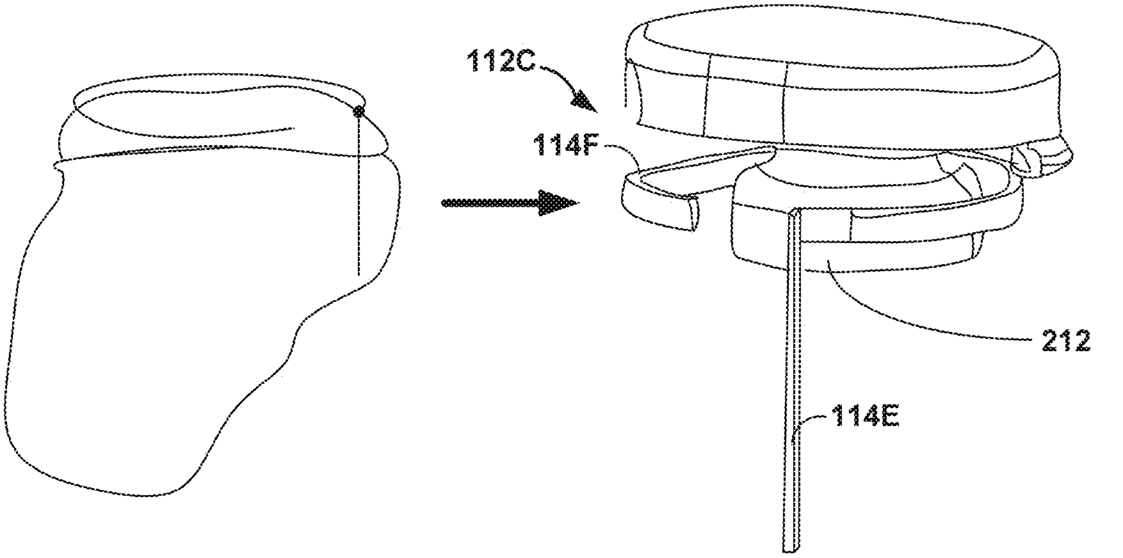
FIG. 5 is a conceptual diagram illustrating a model of an antenna, in accordance with one or more aspects of this disclosure.

FIG. 5 is a conceptual diagram illustrating a model of the antenna 112C within hearing aid 102 illustrated in FIG. 2C. FIG. 5 illustrates how the antenna 112C is transformed to a HFSS (high frequency structure simulator) CAD model for a simulation software. For instance, the right side of FIG. 5 illustrates first segment 114E in the CAD model, and illustrates second segment 114F in the CAD model. In the CAD model, first segment 114E (e.g., segment that goes inside portion of housing 200 that is internal to the ear) is extended to 1 cm instead of 0.5 cm (e.g., as described with respect to FIGS. 2B and 2C, first segment 114C or 114E may be 0.5 cm) to accommodate for dielectric changes inside housing 200 and air inside housing 200.

FIG. 5 also illustrates an example location of battery 212. For instance, battery 212 is located within second segment 114F (e.g., second segment 114F encircles battery 212) so that the communication signal radiates outwards via reflections from battery 212, as illustrated in FIG. 4.

Table 1 below provides the impedance of the antenna model of FIG. 5. For instance, the input impedance of the antenna model can be written as Z=R+jX, where R is the resistance, and X is the reactance.

TABLE 1

| Frequency (GHz) | R (resistance) | X (reactance) |
|---|---|---|
| 2.40 | 13.07 | −195.26 |
| 2.44 | 13.51 | −188.05 |
| 2.48 | 13.98 | −180.95 |

As can be seen from Table 1, the absolute value of the reactance is relatively large, and the values are all negative. This may be indicative that antenna 112C is capacitive. Furthermore, the resistance is approximately 13 to 14 ohms. In some examples, transmission line 222 and/or circuitry of radio 204 may have a resistance different than 13 to 14 ohms, such as 50 ohms, and the reactance may be 0. Therefore, due to the impedance mismatch, there is a possibility of having reflections in the signals transmitted to antenna 112C or received from antenna 112C. By tuning the capacitance of antenna 112C, it may be possible to better match the impedance of antenna 112C with transmission line 222 and/or circuitry of radio 204.

One example way in which to tune the capacitance is to meander first segment 114E to have more of a helix shape. For instance, as illustrated in FIG. 2C and FIG. 5, first segment 114E has a linear shape (e.g., straight). However, by forming first segment 114E with a more helical shape, it may be possible to reduce the absolute value of reactance, and increase the resistance.

Figure 6:
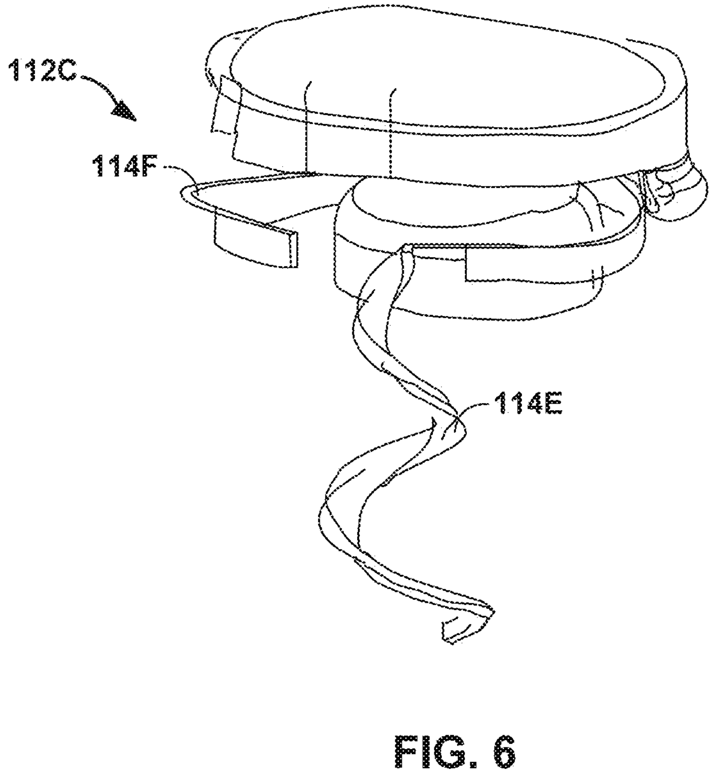
FIG. 6 is another conceptual diagram illustrating a model of an antenna, in accordance with one or more aspects of this disclosure.

FIG. 6 is another conceptual diagram illustrating a model of an antenna, in accordance with one or more aspects of this disclosure. For example, FIG. 6 illustrates an example where first segment 114E has a helix shape, and not a straight shape.

Table 2 below provides the impedance of antenna model of FIG. 6. As can be seen from Table 2, the resistance of antenna 112C with the helix first segment 114E is increased and the absolute value of the reactance has decreased relative to the example where first segment 114E has a linear shape. In the helix shape of first segment 114E, the radium is approximate 1 mm (e.g., 0.5 mm to 1.5 mm), the number of turns is 2 (but more are possible), the pitch is approximately 6 mm (e.g., 5 mm to 7 mm), and the thickness is approximately 0.3 mm (e.g., 0.2 mm to 0.4 mm). It should be understood that the dimensions of the helix shape of first segment 114E are merely one example, and the dimensions should not be considered limiting. Various factors such as actual inductance, resistance of transmission line 222 and/or circuitry of radio 202, size and shape of housing 200, etc. may affect the dimensions of the helix shape of first segment 114E.

In the example illustrated in FIG. 6, the first segment 114E is configured in a helix shape such that an impedance of antenna 112C is closer to an impedance of the circuitry (e.g., circuitry of radio 204 and/or transmission line 222) coupled to antenna 112C as compared to the first segment 114E having a linear shape.

TABLE 2

| Frequency (GHz) | R (resistance) | X (reactance) |
|---|---|---|
| 2.40 | 17.72 | −54.2 |
| 2.44 | 18.34 | −47.58 |
| 2.48 | 18.98 | −41.00 |

Figure 7A:
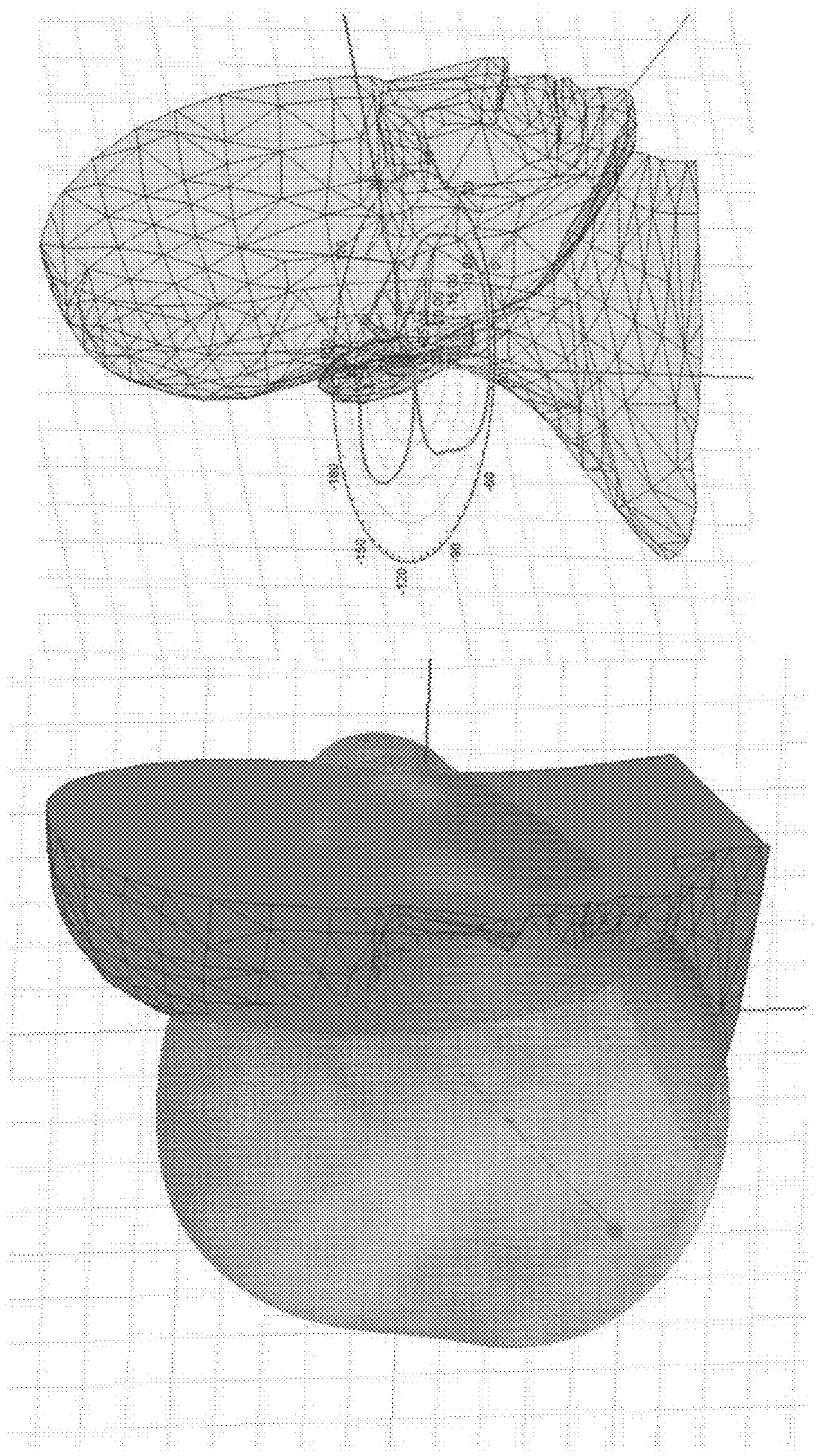
FIGS. 7A and 7B are conceptual diagrams illustrating a radiation pattern based on a model of an antenna, in accordance with one or more aspects of this disclosure.
Figure 7B:
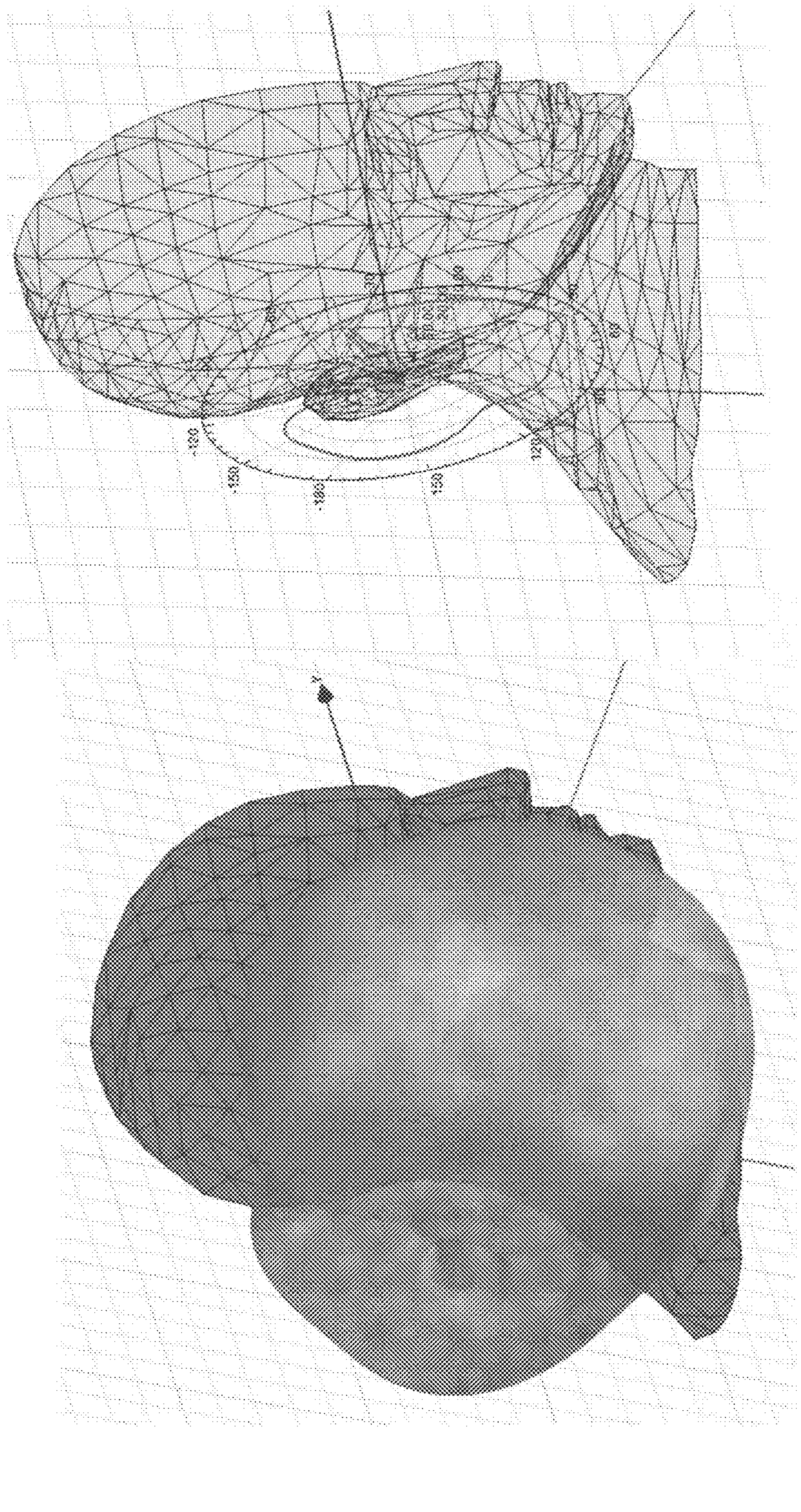

FIGS. 7A and 7B are conceptual diagrams illustrating a radiation pattern based on a model of an antenna, in accordance with one or more aspects of this disclosure. FIGS. 7A and 7B show the radiation pattern of the antenna model illustrated in FIG. 5. The radiation pattern properties of the antenna model illustrated in FIG. 6 are the same as those of the antenna model of FIG. 5 with no major changes except for matching where the reactance is reduced with increase in resistance. For example, with the example of FIG. 6, there may be better matching between antenna 112C and transmission line 222 and/or circuitry of radio 204. For example, as shown in Table 2, the reactance of antenna 112C in the example of FIG. 6 is reduced, and the resistance is increased to better match the impedance of transmission line 222 and/or circuitry of radio 204.

As illustrated in FIGS. 7A and 7B, the radiation pattern has two components due to the orientation of first segment 114E and second segment 114F. Antenna 112C has an average of −20 dB efficiency with an average directivity of 7.55 dB, meaning that antenna 112C has high directivity. For the example of FIG. 5 (e.g., helix shaped first segment 114E), antenna 112C has an average of −20.4 dB efficiency with an average directivity of 8.0 dB.

Table 3 below provides some example measurements of total radiated power (TRP) of antenna 112C measured at a Tesla chamber with and without implementing a matching network. For instance, as noted above, in some examples, a matching network may be included between antenna 112C and transmission line 222 and/or radio 204 to provide impedance matching. The matching network may reduce reflections, but may also reduce the amount of power that is radiated out by antenna 112C because of a reduction in signal strength received by antenna 112C or reduce the amount of power transmitted to radio 204 because some power is lost through the matching network. Moreover, the matching network may cause the TRP to be relatively smooth across the frequency band, such as across the BLE frequency band.

TABLE 3

| | Frequency (MHz) | | | | |
|---|---|---|---|---|---|
| | 2404 | 2420 | 2440 | 2460 | 2478 |
| Helix antenna (dBm) | −15.65 | −20.28 | −19.68 | −15.39 | −14.36 |
| Helix antenna with matching network (dBm) | −16.54 | −18.53 | −15.06 | −15.10 | −18.455 |

As shown in Table 3, the TRP is on average −17 dBm, which is indicative of very good performance, especially after being matched with a matching network.

Figure 8:
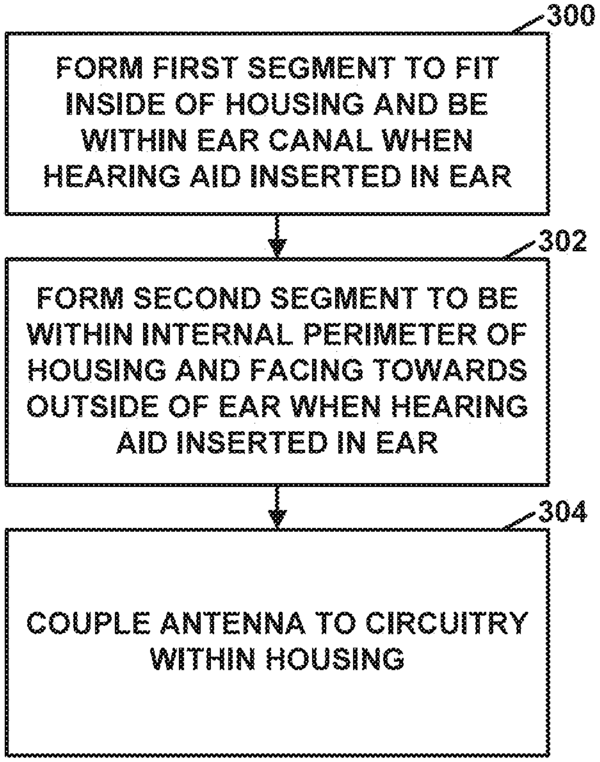
FIG. 8 is a flowchart illustrating an example method of manufacturing a hearing aid, in accordance with one or more aspects of this disclosure.

FIG. 8 is a flowchart illustrating an example method of manufacturing a hearing aid, in accordance with one or more aspects of this disclosure. In the example illustrated in FIG. 8, a manufacturer (e.g., a company that markets hearing aids or an entity with instructions from a company that markets hearing aids) may form first segment 114E of antenna 112C of hearing aid 102 to fit inside housing 200 of hearing aid 102, and to be within an ear canal when hearing aid 102 is inserted into an ear of a wearer (300). The manufacturer may form second segment 114F of antenna 112C of hearing aid 102 to be within an internal perimeter of housing 200 and arranged to be outside of the ear canal (e.g., be within faceplate 201) when hearing aid 102 is inserted into the ear of the wearer (302).

In some examples, first segment 114E is shorter than second segment 114F. For example, the manufacturer may form first segment 114E to be approximately 0.5 cm (e.g., 0.4 to cm), and form second segment 114F to be approximately 3 cm (e.g., 2 cm to 4 cm). Furthermore, the manufacturer may form first segment 114E to be substantially orthogonal to second segment 114F (e.g., 72 degrees to 108 degrees).

There may be various ways to form first segment 114E and second segment 114F of antenna 112C. The manufacture may form first segment 114E in a helix shape such that an impedance of antenna 112C is closer to an impedance of the circuitry (e.g., radio 204 and/or transmission line 222) coupled to antenna 112C as compared to first segment 114E having a linear shape. In some examples, the manufacturer may form second segment 114F to loop back upon itself, such as described above and illustrated with respect to FIG. 2C. For instance, the manufacturer may curve second segment 114F around the internal perimeter of housing 200. In general, the manufacturer may form second segment 114F to have a shape including one of a circular shape, a spiral shape, or a serpentine shape (e.g., zig-zag).

In some examples, the manufacturer may form second segment 114F such that second segment 114F is within a first environment having a first dielectric constant (e.g., 1) when hearing aid 102 is inserted in the ear of the wearer. The manufacturer may form first segment 114E such that first segment 114E is within a second environment having a second dielectric constant (e.g., 35.4) that is substantially greater than the first dielectric constant when hearing aid 200 is inserted in the ear of the wearer.

The manufacturer may couple antenna 112C to circuitry (e.g., radio 204 and/or transmission line 222) within housing 200 that is configured to transmit the signals to antenna 112C and receive the signals from antenna 112C (304). For example, antenna 112C is tuned to transmit and receive signals having a frequency equal to or greater than 2.4 GHz (e.g., configured to transmit and receive signals having a frequency within a frequency band of 2.4 to 2.483 GHz of the BLE technology). Furthermore, the manufacturer may position battery 212 inside housing 200 in a manner to reflect signals transmitted from antenna 112C.

It is to be recognized that depending on the example, certain acts or events of any of the techniques described herein can be performed in a different sequence, may be added, merged, or left out altogether (e.g., not all described acts or events are necessary for the practice of the techniques). Various examples have been described. These and other examples are within the scope of the following claims.

What is claimed is:

1. A hearing aid comprising:

a housing configured to fit inside an ear canal;

an antenna within the housing, the antenna comprising:

a first segment configured to fit inside the housing and to be within the ear canal when the hearing aid is inserted into an ear of a wearer, wherein the first segment has a first end and a second end, and the second end being open ended, wherein the first segment is configured in a helix shape;

a second segment configured to be within the housing and disposed near a side of the housing facing toward an outside of the ear canal when the hearing aid is inserted into the ear of the wearer, wherein the second segment has a third end and a fourth end, and the fourth end being open ended, and an angle of the first segment relative to the second segment is in a range of 72 degrees to 108 degrees;

a first transmission line connected to the first end of the first segment;

a second transmission line is connected to the third end of the second segment; and circuitry, within the housing, coupled to the first and second transmission lines and configured to transmit and receive signals to and from the antenna, wherein a first difference between a first impedance of the antenna having the first segment with the helix shape and an impedance of the circuitry is less than a second difference between a second impedance of the antenna if the first segment had a linear shape and the impedance of the circuitry.

2. The hearing aid of claim 1, wherein the signals have a frequency equal to or greater than 2.4 GHz.

3. The hearing aid of claim 1, wherein the second segment is configured to extend around a perimeter of the housing.

4. The hearing aid of claim 1, wherein the first segment is shorter than the second segment.

5. The hearing aid of claim 1, wherein the first segment and the second segment are in different environments having different dielectric constants when the hearing aid is inserted in the ear of the wearer.

6. The hearing aid of claim 1, wherein the second segment is configured to curve around an internal perimeter of the housing.

7. The hearing aid of claim 1, wherein the second segment is configured in a shape comprising one of a circular shape, a spiral shape, or a serpentine shape.

8. The hearing aid of claim 1, further comprising a battery positioned inside the housing in a manner to reflect the signals transmitted from the antenna.

9. The hearing aid of claim 8, wherein the second segment is configured to encircle the battery.

10. A method of manufacturing a hearing aid, the method comprising:

forming an antenna having a first segment and a second segment, wherein:

the first segment is configured to fit inside a housing of the hearing aid and to be within an ear canal when the hearing aid is inserted into an ear of a wearer, the first segment is configured in a helix shape, the first segment has a first end and a second end, and the second end being open ended, the second segment is configured to be within the housing and disposed near a side of the housing facing toward an outside of the ear canal when the hearing aid is inserted into the ear of the wearer, and the second segment has a third end and a fourth end, and the fourth end being open ended, an angle of the first segment relative to the second segment is in a range of 72 degrees to 108 degrees;

coupling a first transmission line to the first end of the first segment;

coupling a second transmission line to the third end of the second segment; and coupling the first and second transmission lines to circuitry within the housing that is configured to transmit signals to the antenna and receive the signals from the antenna, wherein a first difference between a first impedance of the antenna having the first segment with the helix shape and an impedance of the circuitry is less than a second difference between a second impedance of the antenna if the first segment had a linear shape and the impedance of the circuitry.

11. The method of claim 10, wherein the signals have a frequency equal to or greater than 2.4 GHz.

12. The method of claim 10, wherein the second segment is configured to extend around a perimeter of the housing.

13. The method of claim 10, wherein the first segment and the second segment are in different environments having different dielectric constants when the hearing aid is inserted in the ear of the wearer.

14. The method of claim 10, further comprising positioning a battery inside the housing in a manner to reflect the signals transmitted from the antenna, wherein the second segment is configured to encircle the battery.

15. An antenna configured to be positioned within a hearing aid, the antenna comprising:

a first segment configured to fit inside a housing of the hearing aid and to be within an ear canal when the hearing aid is inserted into an ear of a wearer, wherein the first segment has a first end and a second end, and the second end being open ended, wherein the first segment is configured in a helix shape; and a second segment configured to be within the housing and disposed near a side of the housing facing toward an outside of the ear canal when the hearing aid is inserted into the ear of the wearer, wherein the second segment has a third end and a fourth end, and the fourth end being open ended, and an angle of the first segment relative to the second segment is in a range of 72 degrees to 108 degrees, wherein:

the first end of the first segment is configured to be connected to a first transmission line that is coupled to circuitry that is within the housing and that is configured to transmit and receive signals to and from the antenna, and the third end of the second segment is configured to be connected to a second transmission line coupled to the circuitry, wherein a first difference between a first impedance of the antenna having the first segment with the helix shape and an impedance of the circuitry is less than a second difference between a second impedance of the antenna if the first segment had a linear shape and the impedance of the circuitry.

16. The hearing aid of claim 1, wherein the helix shape has a radius of approximately 1 mm, a number of turns of the helix shape is 2, and a pitch of the helix shape is approximately 6 mm.

* * * * *